W. CHRISTIE.

TRACTOR.

APPLICATION FILED MAY 4, 1920.

Reissued June 1, 1920.

14,868.

4 SHEETS—SHEET 1.

Inventor
Walter Christie
By his Attorneys
Redding & Grady

W. CHRISTIE.

TRACTOR.

APPLICATION FILED MAY 4, 1920.

Reissued June 1, 1920.

14,868.

4 SHEETS—SHEET 2.

Inventor
Walter Christie
By his Attorneys
Redding & Greeley

W. CHRISTIE.

TRACTOR.

APPLICATION FILED MAY 4, 1920.

Reissued June 1, 1920.

14,868.

4 SHEETS—SHEET 3.

Inventor
Walter Christie
By his Attorneys
Redding & Greely

W. CHRISTIE.
TRACTOR.
APPLICATION FILED MAY 4, 1920.
Reissued June 1, 1920.
14,868.
4 SHEETS—SHEET 4.
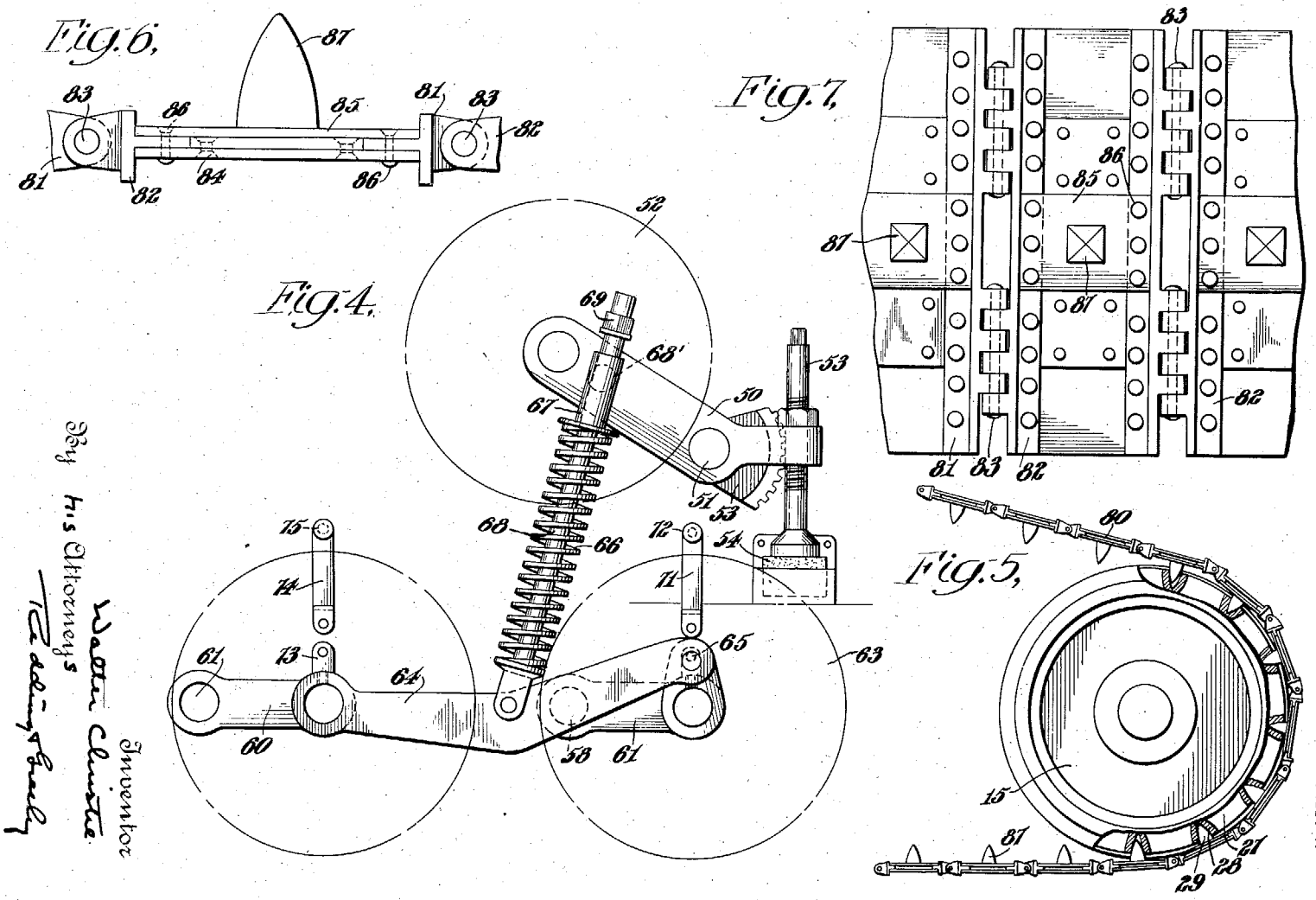
Inventor
Walter Christie
By His Attorneys
Redding & Bradley

UNITED STATES PATENT OFFICE.

WALTER CHRISTIE, OF WEEHAWKEN, NEW JERSEY.

TRACTOR.

14,868. Specification of Reissued Letters Patent. Reissued June 1, 1920.

Original No. 1,336,130, dated April 6, 1920, Serial No. 259,310, filed October 23, 1918. Application for reissue filed May 4, 1920. Serial No. 378,748.

*To all whom it may concern:*

Be it known that I, WALTER CHRISTIE, a citizen of the United States of America, and a resident of Weehawken, Hudson county, and State of New Jersey, have invented certain new and useful Improvements in Tractors, of which the following is a specification, reference being had to the accompanying drawings, forming a part thereof.

My invention relates to new and useful improvements in tractors and its object is to provide a simple and efficient apparatus of great strength.

Another object is to provide a dirigible tractor which may run either on its wheels or on chains under its wheels.

Other objects are to provide great flexibility to the running gear, a convenient and easily operated control mechanism, and power transmission of wide range. More specifically, the object of this invention is to provide a tractor for military purposes which is well adapted to serve as a gun carriage and by means of which a gun or other heavy object may be moved over difficult surfaces and also may be transported rapidly over roads or other good surfaces.

In order that my invention may be thoroughly understood, I will now proceed to describe the same in the following specification, and will then point out the novel features thereof in appended claims.

Referring to the drawings:

Fig. 4 is a side elevation of the supports for the chain tension wheels.

Fig. 5 is a side elevation, partly in section of one of the end chain wheels and a part of one of the tractor chains.

Fig. 6 is an enlarged side elevation showing in detail the construction of the improved tractor chain and Fig. 7 is a plan view of a similar part of the chain.

Like characters of reference designate corresponding parts in all the figures.

Figure 3:
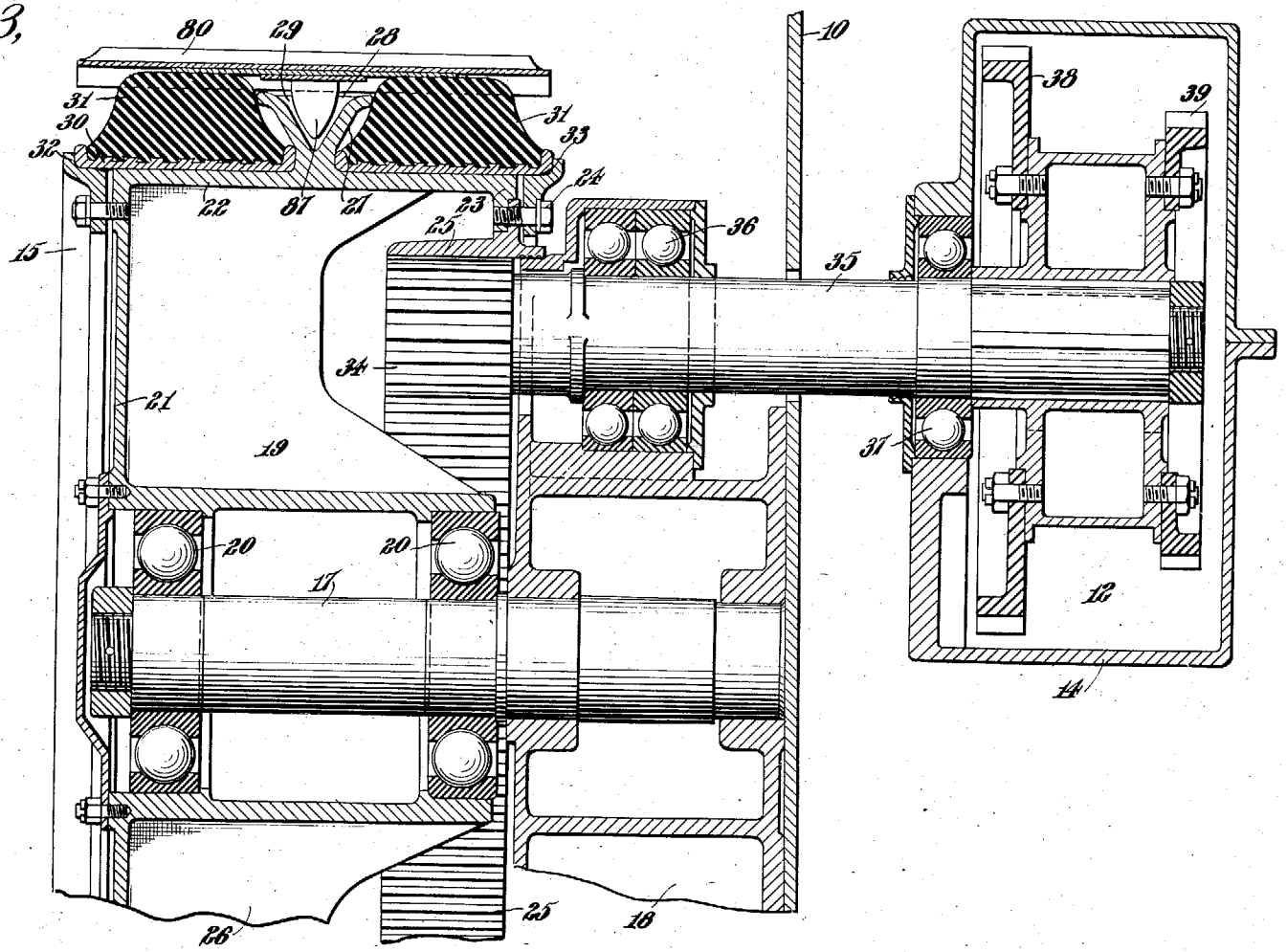
Fig. 3 is an enlarged sectional end elevation of the upper portion of one of the driven wheels and parts of its driving mechanism.

10 designates a rigid metallic frame upon which the various parts of the apparatus are mounted. 11 is an engine set transversely on this frame near one of its ends and connected by independent transmission gearing 12 within the casings 13 and 14 to drive either or both of the wheels 15 or 16. A part of one of these wheels is shown in detail in Fig. 3. 17 is an axle rigidly affixed to a housing 18 attached to the frame 10 and supporting the hub 19 of the wheel by interposed ball bearings 20. From the outer end of the hub extends a flange 21 to the outer part of which is integrally connected the felly 22. The edge of the felly which is opposite the flange extends inwardly to form an annular rib 23 to which is affixed by bolts 24 an internal gear 25. 26 designates webs between the hub and the felly.

The outside of the felly extends as at 27 to form a flaring annular channel which is divided by equally spaced transverse walls 28 into a series of pockets 29. The rims 30 which fit over the felly carry shoes 31 and are clamped onto the wheel by rings 32, 33. The latter is held in place by the bolts 24 which secure the gear 25 to the wheel.

34 is a pinion in mesh with the gear 25. Its shaft 35 is supported by the housing 18 by interposed ball bearings 36 and by the transmission gear casing 14 and bearings 37. The gears 38 and 39 which form parts of the transmission gearing are rigidly connected with the pinion shaft 35.

From the parts which have been described it may be seen that the driving power of the engine 11 may be transmitted to rotate the wheel 15 and it is to be understood that similar mechanisms are provided between the engine and the other driven wheel 16.

At the other end of the frame 10 in alinement with the wheels 15 and 16 are auxiliary vehicle wheels 40, 41, rotatably mounted on rigid axles. The main vehicle wheels designated by 42 and 43 are near these. They are pivotally mounted near the ends of a transverse axle such as 44 on radius rods 45. 46 are springs between the radius rods and the vehicle frame. The positions of the pivot pins for these wheels is shown at 47 in Fig. 2. The opposite ends of a transverse steering rod 48 are connected to non-rotative parts of these wheels and the rod is connected by suitable mechanism with a steering wheel 49.

50 is a lever, pivoted to frame 10 at 51.

Near one end it carries the axle of a tension wheel 52 and on the part opposite the pivot 51 is an adjustable bolt 53, the lower end of which rests on a rubber buffer 54 affixed to the frame 10. This adjustably limits the upward movement of the tension wheel 52.

55 is a worm segment which is either an integral part of or affixed to the arm 50. A worm 57 is pivotally supported at 58 in such a way that it may be moved into or out of mesh with the segment 55. 56 is the spindle of this worm by means of which it may be rotated.

60 and 61 are arms pivoted to the frame 10 and carrying ground tension wheels 62 and 63. 64 is a rock lever from the axle of wheel 62 to a point above the axle of wheel 63 with which it is connected by a link 65.

66 is a rod pivoted to lever 64 midway between the axles of the tension wheels 62, 63, which passes up through a collar 67 which is pivoted to lever 50 at 68′. A compression spring 68 between this collar and a head near the lower end of the rod 66 tends to force the levers 50 and 64 apart. 69 is a stop on rod 66 which limits the amount of separation of the two levers 50 and 64.

A perforated lug 70 projects upwardly from the axle of wheels 63. 71 is a link pivotally suspended from a point 72 on the frame above the lug 70 with a perforation near its lower end. A similar lug 73 projects upwardly from the axle of wheel 62. 74 is a link suspended from the frame at 75 above this lug 73. Near the adjacent ends of the lug 73 and the link 74 perforations are provided. Similar parts to those specifically described are on the other side of the apparatus.

The peripheries of the main and auxiliary vehicle wheels and of all of the tension wheels are similar to those of the driven wheels 15 and 16 except that the transverse walls 28 which form the pockets 29 are omitted.

The creeper chain 80 which forms the tread for the tractor is constructed as shown in Figs. 6 and 7. It comprises pairs of transverse members 81 and 82 pivoted together as at 83, and longitudinal members 84 and 85 riveted to the transverse members at 86. Each of the inner longitudinal members 85 is constructed with a pointed lug 87 and these lugs fit in the pockets 29 of the driven wheels 15 and 16. The chain which passes around wheel 15 is carried up over tension wheel 52, thence around the auxiliary vehicle wheel 40, under the main vehicle wheel 42, under the tension wheels 62 and 63 and to the driven wheel 15. The transverse members of the chain lie against the tires 31 of all of these wheels and the lugs 87 pass freely through the channels 27 between the tires.

The tractor may of course be used for various purposes. As shown in the drawings a gun 90 is mounted on it with its trunnions supported in a frame comprising side members 91. This gun frame is pivoted to the vehicle frame 10 at 92 about which pivot it has a limited rotative movement on the guides 93. For further lateral adjustment of the gun the position of the apparatus as a whole is shifted.

At the end of the apparatus under the breech of the gun are sprags 94, pivoted to the frame 10 and so arranged that they may be let down into engagement with the ground when desired.

Between the engine 11 and each of the driven wheels 15 and 16 are back gears within casings 100 and 101, connected respectively to control levers 102 and 103 near levers 76 and 77. These are provided for the purpose of increasing the gear ratio between the shaft of the engine 11 and the adjustable gears within the casings 13 and 14. In operating the apparatus as a creeper tractor these back gears are used, as under this condition the apparatus is run at comparatively low speeds. It is then steered by manipulation of levers 76 and 77 to vary the rates at which the two creeper chains are driven. It is obvious that these may be driven at the same or at different rates, or that if desired one may be driven in one direction to effect a quick turning of the apparatus.

The supports for the tension wheels are such that the wheels 62 and 63 have a large and independent range of movement in their vertical planes and will be moved upwardly in passing over obstructions, and downwardly with sufficient force to support a considerable part of the weight of the apparatus when passing over hollows in the terrain. It is also possible for the wheels 62 and 63 on one side of the apparatus to be moved upwardly or downwardly in passing projections or depressions on the ground while those on the other side are moved in the opposite direction.

The stop 53—54 prevents the spring 68 from putting any tension on the chains 80 when the apparatus is running over flat surfaces. But when a hollow is reached so that either or both of the wheels 62—63 is forced downwardly by the spring 68, there is a tendency to shorten the length of chain 80 which is compensated for by the downward movement of wheel 52 against the action of spring 68 which results in maintaining the chain tension. When desired the chain tension may be increased by increasing the compression of the spring. Obviously, the action of the tension wheels and their supports on one side of the apparatus is independent of that of similar parts on the other side.

With this apparatus a strong and rigid frame is supported on tractor chains of great flexibility and the whole apparatus is capable of moving over decidedly rough country and of successfully traversing terrain which is impassible to other devices of this general character.

The apparatus is however arranged to run on its wheels instead of on the chains 80. To arrange it for this operation the worm 57 is moved into mesh with the segment 53 and turned to raise lever 50. This will bring collar 67 against the stop 69. Further upward movement of lever 50 will raise lever 64 until the perforations in the lug 73 and the link 74 are in alinement. A pin is then thrust through these perforations and the lever 64 given a further upward movement to bring the perforations in lug 70 and link 71 into position to receive another pin. After this the worm 57 is rotated in the opposite direction to lower lever 50 against the thrust of the spring 68 which releases the tension on chain 80. This chain may now be removed and if desired the pins through the lugs 70 and 73 may be removed also.

Figure 1:
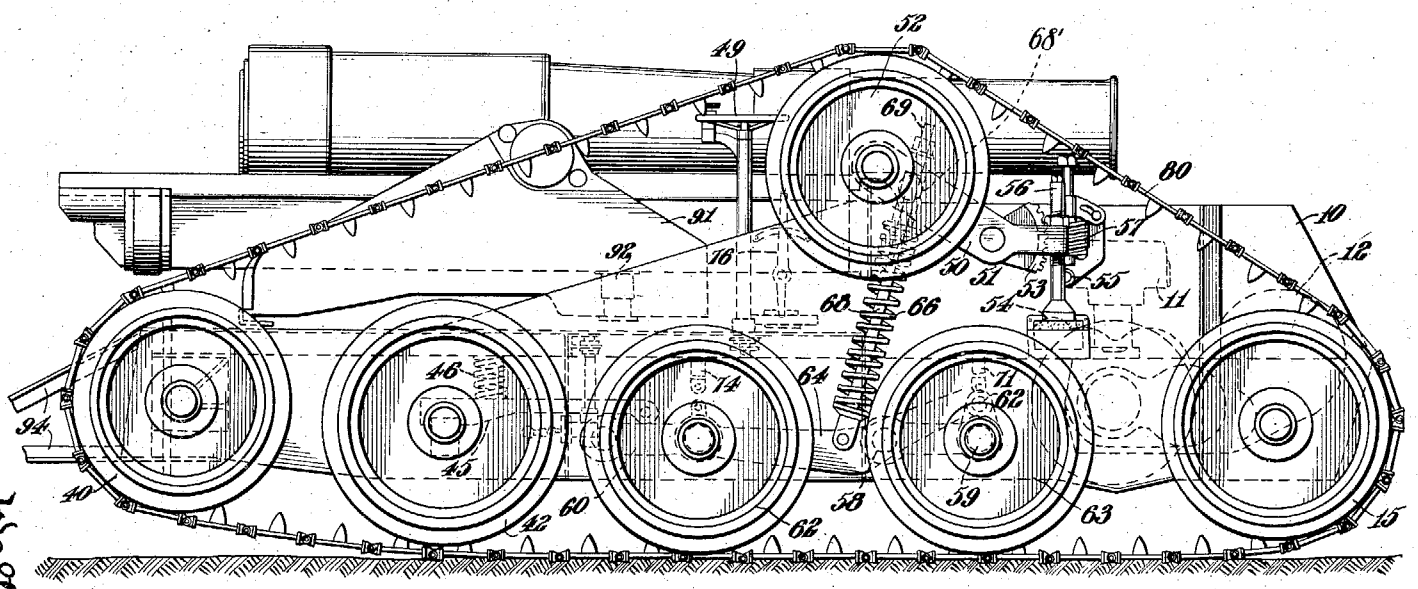
Figure 1 is a side elevation of a tractor and gun carriage which is made according to and embodies this invention.
Figure 2:
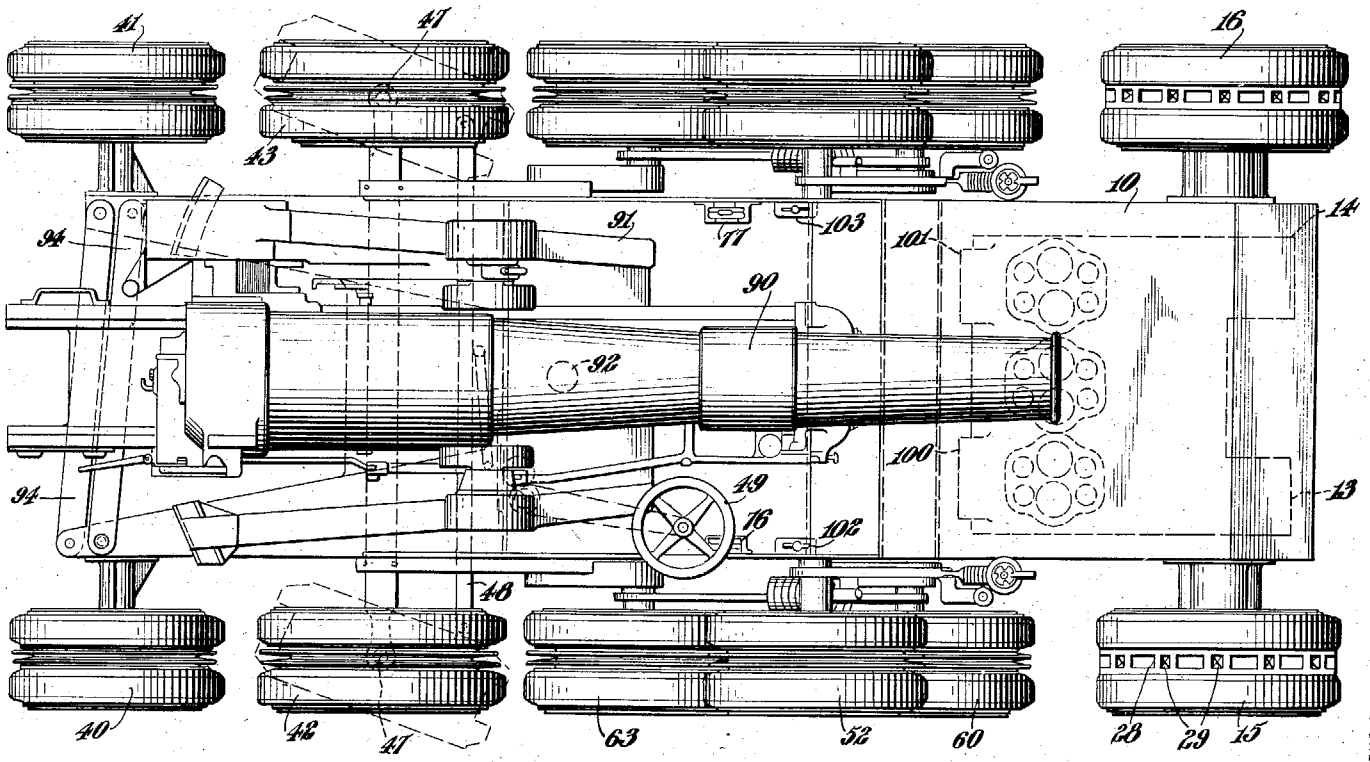
Fig. 2 is a plan view of the same apparatus.

Now the driven wheels 15 and 16 will be in direct engagement with the ground and the apparatus will rest upon them and upon the main vehicle wheels 42, 43. In this condition the levers 102 and 103 are moved to throw out the back gears as apparatus may be driven at greater speeds than is practicable when the chains 80 are used. The main wheels 42, 43 are on vertical pivots at 47 about which they may be turned by means of the steering wheel 49 as shown in Fig. 2. When thus arranged the apparatus may be steered by the wheel 49 in the manner of an ordinary automobile truck. There is no differential gear between the driven wheels 15 and 16 as this is not necessary for the usual guiding of the apparatus. But one of these wheels may be driven faster than the other or the driving connection between one of them and the engine may be disconnected by suitable manipulation of the levers 76 and 77 when it is necessary to go around sharp curves.

The chains are of such character and relative to the wheels that when applied thereto they may serve to hold the steering wheels 42, 43 against angular movement although in some constructions it may be advisable to further lock the steering wheels when the chains are used. In the illustrated embodiment the steering wheel 49 is shown as locked by a spring-pressed bolt engaging a socket 106 to hold the wheels 42, 43 in alinement with the driven wheels 15, 16. With the wheels 42, 43 held against angular movement when the chains are applied it will be evident that that portion of each chain which is in contact with the ground is maintained at all times in substantially longitudinal alinement. When running on wheels mud hook chains may be placed around the peripheries of the driven wheels to increase their adherence to the ground.

It is to be noted that the axes of the auxiliary wheels 40, 41 at the front end of the apparatus, are higher than those of the main or steering wheels 42, 43. This is for the purpose of increasing the climbing capability of the machine. The term "load carrying road wheels" as used in the claims refers to the main vehicle wheels 15, 16, 42, 43 which run on the ground when the chains are removed and serve to support the weight of the vehicle. It is evident, however, that the auxiliary wheels 62, 63 may be pressed to the ground when the chains are removed and may carry a fraction of the load.

A structure of preferred form and construction has been illustrated and described for the purpose of showing a way in which this invention may be used, but the inventive thought upon which this application is based is broader than this illustrative embodiment, and I therefore intend no limitations other than those imposed by the appended claims.

What I claim is:

1. In a vehicle, a frame, and sets of load carrying road wheels connected to the frame and including steering wheels mounted for angular movement, said wheels formed to receive removable creeper chains, the steering wheels being held against angular movement when the chains are in place.

2. In a vehicle, a frame, sets of load carrying road wheels connected to the frame including steering wheels mounted for angular movement, said wheels formed to receive removable creeper chains, the steering wheels held against angular movement when the chains are in place and tension devices for the chains.

3. In a vehicle, a frame, a motor, sets of load carrying road wheels connected to the frame including steering wheels mounted for angular movement, said wheels formed to receive removable creeper chains, the steering wheels held against angular movement when the chains are in place and means to connect the chains with the motor for propulsion of the tractor.

4. In a vehicle, a frame, a motor, sets of load carrying road wheels connected to the frame including steering wheels mounted for angular movement, said wheels formed to receive removable creeper chains, the steering wheels held against angular movement when the chains are in place, means to connect certain of said wheels with the motor and means to connect the chains in driving engagement with said last named wheels when the chains are applied.

5. In a vehicle, a frame, sets of load carrying road wheels connected to the frame including steering wheels mounted for angular movement, said wheels formed to receive removable creeper chains, the steering wheels held against angular movement when the chains are in place and tension devices for the chains including wheels between said road wheels, and means to press said last named wheels into engagement with the respective chains.

6. In a vehicle, a frame, a motor, a driven wheel connected therewith and arranged to run on the ground, a steering wheel also arranged to run on the ground and mounted for angular movement, both of said wheels being connected to the frame and formed to receive a removable creeper chain, the steering wheel held against angular movement when the chain is in place.

7. In a vehicle, a frame, sets of load carrying road wheels connected to the frame and including steering wheels mounted for angular movement, said wheels formed to receive removable creeper chains, and means for locking the steering wheels against angular movement.

8. In a vehicle, a frame, a motor, sets of load carrying road wheels connected to the frame and including steering wheels mounted for angular movement, said wheels formed to receive removable creeper chains, the steering wheels held against angular movement when the chains are in place, means to connect certain of said wheels with the motor, including dependent adjustable transmission connections, and means to connect the chains in driving engagement with said last named wheels when the chains are applied.

9. In a vehicle, a frame, a motor, sets of load carrying road wheels connected to the frame and including steering wheels mounted for angular movement, said wheels formed to receive removable creeper chains, the steering wheels held against angular movement when the chains are in place, means to connect certain of said wheels with the motor including independent adjustable transmission connections and manually controlled speed-reduction gearing between the motor and each of said transmission connections, and means to connect the chains in driving engagement with said last named wheels when the chains are applied.

10. In a tractor, a frame, a motor, driven wheels on opposite sides of the frame near one end thereof arranged to run on the ground, independent adjustable transmission connections between the motor and each of said driven wheels, auxiliary wheels on opposite sides of the frame near the other end, steering wheels on oposite sides of the frame between the driven and auxiliary wheels also arranged to run on the ground, said steering wheels being lower than said auxiliary wheels, all of said wheels formed to receive removable creeper chains and said driven wheels having parts arranged to drive such chains, and the steering wheels held against angular movement when the chains are in place.

11. In a tractor, a frame, a motor, driven wheels on opposite sides of the frame near one end thereof, arranged to run on the ground, independent adjustable transmission connections between the motor and each of said driven wheels, auxiliary vehicle wheels on opposite sides of the frame near the other end thereof, steering wheels on opposite sides of the frame between the driven and auxiliary wheels, also arranged to run on the ground, said steering wheels being lower than said auxiliary wheels, all of said wheels having parts arranged to receive and guide a removable creeper chain, and said driven wheels having parts arranged to drive such chains, steering gear connected with the steering wheels, and means for locking said gear to hold the steering wheels in alinement with the auxiliary and driven wheels.

12. In a tractor, a frame, a motor, a pair of driven wheels on opposite sides of the frame arranged to run on the ground, connections between the motor and said driven wheels, other vehicle wheels on opposite sides of the frame arranged to run on the ground and spaced from said driven wheels, all of said wheels formed to receive removable creeper chains, a tension device for each chain between its driven wheel and its other vehicle wheel, said tension device comprising an upper tension wheel and a lower tension wheel in engagement with the chain and means for forcing said tension wheels apart.

13. In a tractor, a frame, a motor, a pair of driven road wheels on opposite sides of the frame, connections between the motor and said driven wheels, other road wheels on opposite sides of the frame, spaced from said driven wheels and removable creeper chains around said wheels; combined with a tension device for each chain between its driven wheel and its other vehicle wheel, said tension device comprising an upper tension wheel and a lower tension wheel in engagement with the chain, means for forcing said tension wheels apart, and means for limiting the upward movement of the upper tension wheel.

14. In a tractor, a frame, a motor, a pair of driven road wheels on opposite sides of the frame, connections between the motor and said driven wheels, other road wheels on opposite sides of the frame, spaced from said driven wheels and removable creeper chains around said wheels; combined with a tension device for each chain between its driven wheel and its other vehicle wheel, said tension device comprising an upper tension wheel, and a lower tension wheel in engagement with the chain, a compression spring for forcing said tension wheels apart, and adjustable means for limiting the upward movement of the upper tension wheel.

15. In a tractor, a frame, a motor, a pair of driven road wheels on opposite sides of the frame, connections between the motor and said driven wheels, other road wheels on opposite sides of the frame; spaced from said driven wheels and removable creeper chains around said wheels; combined with a tension device for each chain between its driven wheel and its other vehicle wheel, said tension device comprising an upper tension wheel and a lower tension wheel in engagement with the chain, automatic means for forcing said tension wheels apart, and manually actuated means for drawing the tension wheels toward each other.

16. In a tractor, a frame, a motor, a pair of driven road wheels on opposite sides of the frame, connections between the motor and said driven wheels, other road wheels on opposite sides of the frame, spaced from said driven wheels and removable creeper chains around said wheels; combined with a tension device for each chain between its driven wheel and its other vehicle wheel, said tension device comprising an upper tension wheel and a lower tension wheel in engagement with the chain, means for forcing said tension wheels apart, and manually actuated means for raising the lower tension wheel and means for holding said lower tension wheel in its raised position.

17. In a tractor, a frame, a motor, a pair of driven road wheels on opposite sides of the frame, connections between the motor and said driven wheels, other road wheels on opposite sides of the frame, spaced from said driven wheels and removable creeper chains around said wheels; combined with a tension device for each chain between its driven wheel and its other vehicle wheel, said tension device comprising an upper tension wheel, a pair of lower tension wheels, independently movable supports for said lower tension wheels, and means for forcing the lower tension wheels and the upper tension wheel apart.

18. In a tractor, a frame, a motor, a pair of driven road wheels on opposite sides of the frame, connections between the motor and said driven wheels, other road wheels on opposite sides of the frame, spaced from said driven wheels and removable creeper chains around said wheels; combined with a tension device for each chain between its driven wheel and its other vehicle wheel, said tension device comprising an upper tension wheel, a pair of lower tension wheels, independently movable supports for all of said tension wheels, and a compression spring between the supports for the lower tension wheels and the support for the upper tension wheel.

19. In a tractor, a frame, a motor, a pair of driven road wheels on opposite sides of the frame, connections between the motor and said driven wheels, other road wheels on opposite sides of the frame, spaced from said driven wheels and removable creeper chains around said wheels; combined with a tension device for each chain between its driven wheel and its other vehicle wheel, said tension device comprising an upper tension wheel, a pair of lower tension wheels, independently movable supports for all of said tension wheels, a compression spring between the supports for the lower tension wheel, and adjustable means for limiting the upward movement of the support for the upper tension wheel.

20. In a vehicle, a frame, sets of load carrying road wheels connected to the frame and including steering wheels mounted for angular movement, all of said wheels having resilient peripheral tread portions adapted to run on the ground and to receive removable creeper chains, the steering wheels held against angular movement when the chains are in place, said tread portions being separated by intervening spaces and said creeper chains having guiding devices engaging in the spaces between said separated tread portions.

21. In a tractor, a frame, a motor, sets of load carrying road wheels connected to the frame and having resilient peripheral spaced tread portions to run on the ground, means connecting certain of said wheels with the motor for propulsion of the tractor as a wheeled vehicle, said driven wheels having pockets formed in the spaces between said resilient tread portions, steering wheels included in said road wheels and mounted to swing angularly, removable creeper chains passing under all the wheels of a set respectively, the steering wheels held against angular movement when the chains are in place, and means carried by the chains and engaging said pockets to provide a positive drive connection between said driven wheels and the chains.

In witness whereof I have hereunto set my hand this 4th day of May, 1920.

WALTER CHRISTIE.